United States Patent [19]

Haldeman

[11] 4,016,322

[45] Apr. 5, 1977

[54] ABLATIVE PROTECTIVE MATERIAL FOR REENTRY BODIES

[75] Inventor: Charles W. Haldeman, Concord, Mass.

[73] Assignee: The United States of America as represented by the Secretary of the Air Force, Washington, D.C.

[22] Filed: Sept. 12, 1975

[21] Appl. No.: 612,873

[52] U.S. Cl. .............................. 428/246; 156/243; 156/245; 264/257; 264/331; 428/408; 428/421

[51] Int. Cl.$^2$ .......................................... B32B 7/00

[58] Field of Search ........... 264/257, 331; 428/246, 428/247, 408, 421; 156/242, 243, 245; 308/238

[56] References Cited

UNITED STATES PATENTS

| 3,072,558 | 1/1963 | Myers et al. | 204/280 |
|---|---|---|---|
| 3,082,485 | 3/1963 | Thomas | 264/257 |
| 3,108,018 | 10/1963 | Lewis | 428/408 |
| 3,203,849 | 8/1965 | Kotz et al. | 428/408 |
| 3,369,924 | 2/1968 | Duggins et al. | 428/408 |
| 3,458,374 | 7/1969 | Shobert | 428/421 |
| 3,768,760 | 10/1973 | Jensen | 244/123 |
| 3,778,336 | 12/1973 | Adams | 428/421 |
| 3,925,587 | 12/1975 | Park | 428/408 |

FOREIGN PATENTS OR APPLICATIONS

| 1,292,355 | 3/1962 | France | 428/408 |
|---|---|---|---|

OTHER PUBLICATIONS

"Modmor High Modulus Carbon Fibers" Engineering Materials & Design Mar. 1969, p. 7 of ad between 80 and 81.
"Carbon Fiber" Fillers & Reinforcements.

Primary Examiner—James J. Bell
Attorney, Agent, or Firm—Joseph E. Rusz; William J. O'Brien

[57] ABSTRACT

An ablative material for use with reentry vehicles and characterized by having a low plasma electron density. The material is a laminated composite composed of about 15.6 percent by weight carbon, 3.4 percent by weight phenolic resin, and 81 percent by weight polytetrafluoroethylene.

3 Claims, No Drawings

ABLATIVE PROTECTIVE MATERIAL FOR REENTRY BODIES

STATEMENT OF GOVERNMENT INTEREST

The invention described herein may be manufactured and used by or for the Government for governmental purposes without the paymend of any royalty thereon.

BACKGROUND OF THE INVENTION

This invention relates to ablative materials for use in provided thermal protection to reentry vehicles. More particularly, this invention concerns itself with the fabrication of ablative materials having reduced plasma electron density.

The problem of providing thermal protection for reentty vehicles has become of paramount importance with the recent interest in space travel. The reentry vehicle often contains a number of scientific and communication instruments programmed to send back various technical data to ground control stations. These instruments are particularly vulnerable to damage at the elevated temperatures encountered during the reentry regime. Consequently, a large research effort has evolved in attempting to overcome the reentry heat problem. Various ceramic materials have been suggested as ablative shields because of their excellent heat resistance. These materials, however, do not compensate for the difference in thermal expansion between the ceramic shield and the material of the reentry vehicles. The interval stress generated by the difference in thermal expansion produces cracking which minimizes the insulation value of the ceramic.

In order to overcome the cracking problem, a number of resinous material has been evaluated for their heat resistance. A carbon-phenolic laminate, for example, gives a high degree of thermal protection with little evidence of cracking during the stress and strain of reentry. However, the carbon-phenolics produce a very high density of electrons which contributes to a communications blackout under same conditions between the reentry vehicle and its ground control station.

With the present invention, however, it has been found that certain materials are capable of decreasing the electron density in the reentry plasma sheath when they are added to the sheath by spraying out from the surface. The plasma of the ablative material of this invention greatly reduces electron density and tends to eliminate the communications blackout often encountered during reentry. The material of the invention is composed of a phenolic resin impregnated carbon or graphite cloth laminated with a polytetrafluoroethylene resin.

SUMMARY OF THE INVENTION

In accordance with this invention, it has been discovered that a laminated ablative material composed of carbon or graphite cloth, teflon and a phenolic resin binder greatly decreases the ablative layer electron density of a reentry plasma sheath, thereby eliminating the communications blackout often encountered during the reentry regime of a space vehicle. The ablative material was prepared by hot pressing the laminate into a predetermined nose cone configuration. The laminate was fabricated by impregnating a small amount of a phenolic resin into the carbon or graphite cloth. The resin impregnated cloth was then placed into an appropriate nose cone mold and coated with a teflon dispersion. The mold was closed and pressed at elevated temperature. The resulting nose cone was then removed from the mold and post cured at elevated temperature to produce the laminated ablation material of this invention.

Accordingly, the primary object of this invention is to provide an ablative protective material for reentry vehicles that possess a reduced plasma electron density.

Another object of this invention is to provide a means for protecting the instrumentation package of a reentry vehicle from the degradative effects of a high temperature reentry environment.

Still another object of this invention is to provide a means for preventing the communications backout that occurs between a reentry vehicle and its ground control station during reentry while simultaneously protecting the reentry vehicles instrument package from thermal degratation.

The above and still other objects, advantages and features of this invention will become more readily apparent upon consideration of the following detailed description thereof.

DESCRIPTION OF THE PREFERRED EMBODIMENT

Pursuant to the above-defined objects, the present invention contemplates the fabrication of an ablative material for use in providing thermal protection for reentry vehicles. The material comprises a laminated composite of teflon plastic and a phenolic resin impregnated graphite or carbon cloth. The novel material of this invention is nearly as heat resistant as the previously known carbon phenolic ablations but, produces low electron densities on the reentry plasma sheath. The lowering of the electron density eliminates the communications blackout problem under some conditions when the material is added to the plasma by spraying out from the surface.

In order to evaluate the effectiveness of the ablative material of this invention, the laminated composite was fabricated by pressing in a mold having a predetermined nose cone configuration.

In order to compare ablation rates, microwave transmission, and electron density in the plasma layer, phenolic composites were also included, as was pure teflon.

The object of the evaluation program was to study the effects of measured quantities of ablative on the plasma sheath electrical properties as well as to evaluate the graphite-teflon composite—an ablative material which produced much lower electron density levels than carbon-phenolic ablatives, combined with ablayion rates significantly lower than pure teflon.

In order to determine the approximate cold-wall heat flux at two points on the nose cone configuration, calorimeter-type heat flux gages were located on the front and rear portions of the cone. Measured average values varied from 8 to 13 Btu/sec/ft$^2$ near the nose and from 6 to 10 Btu/sec/ft$^2$ back of the cone. During the arc starting transient, peak heat fluxes as high as 28 Btu/sec/ft$^2$ were recorded. Heat fluxes were determined from recorded calorimeter time histories taken at the start of each evaluation test.

Characteristics of each nose are listed in Table I. Densities and porosities were determined by weighing dry, submerged in reagent methanol, and wet. Methanol was used to limit possible contamination of the model by sodium from water.

Each nose was individually hot-pressed from a predetermined number of resin impregnated cut strips of cloth. Because of the different character of the Teflon and phenolic resins, procedures were different for the two types of construction. In order to build up the sharp nose curvature and varying thickness, many trials were required to find the correct shape and number of pieces of cloth for lamination into a nose. Once this was determined, all noses of one type used the same lay-up arrangement as noted in Table 1.

In the laminating procedure for the carbon pholic composite, since excess phenolic resin was readily pressed out of the die and flowed easily between layers of the cloth, there was no need to limit the amount of resin used to saturate the cloth pieces. They were thoroughly saturated with BSLD3135, a phenolic resin from Union Carbide Co. and air dried in the oven at 200° F. for 1 hour. The cloth pieces were then laid up on the male part of a nose cone mold which has been preheated to 300° F. The mold was then assembled and pressed at 300° F. and 600 psi overnight. After removal from the mold, the nose was post cured overnight at 350° F.

In laminating the teflon-graphite or carbon composite of this invention, the thixotropic nature of Teflon at the pressing termperature and its high lubricity, require that the mold pressures be kept at or below 300 psi to prevent extrusion of the cloth from the die. It was necessary, therefore, to control the amount of teflon applied to the cloth before pressing. This was done by weighing the carbon or graphite cloth pieces to be used and then repeatedly coating them with Teflon T-30, polytetrafluoroethylene dispersion from the DuPont corporation, and drying in air at 200° F. until a predetermined weight of 5.4 times the original cloth weight was reached. The mold was then preheated to 300° F. and the Teflon coated pieces were laid up. The mold was closed and pressed at 100 psi and 300° F. for 4 hours. Pressure was then increased to 300 psi and temperature to 750° F. which were maintained overnight. The nose was then removed and post cured overnight at 400° F.

A small amount of phenolic resin, added to the carbon or graphite cloth before the Teflon tends to cement the fibers and prevent the rapid physical removal of short lengths of the fine carbon fibers during ablation. In the lamination procedure, one third the cloth weight for BLSD 3135 resin was dissolved in ten times its weight of acetone and this was used to saturate the cloth. The cloth was air-dried at 200° F. and then the T-30 dispersion was added until the total dry weight reached 5.4 times the weight of cloth plus resin. Pressing and post curing were then carried out as disclosed above. All Teflon compositions were constructed to provide 81 % Teflon.

For ablation measurements nose weights (without heat flux gages) were recorded before and after each run. The average ablation rate was then found by dividing the weight loss by the duration of the run.

In order to compare the characteristics of the Teflon laminates with solid Teflon in the same environment, two noses were machined from solid Teflon bar stock. In addition, one nose was machined with a series of transverse and axis grooves 1/16 inch wide and ⅛ inch apart to provide a cross-hatched pattern. This configuration was chosen in an effort to provide a higher mass ablation rate than solid Teflon.

Tests using a bench-mounted arc jet at 1 atmosphere pressure and a Mach number of approximately 1 indicated a much greater rate of ablation for the textured material.

The ablation tests were carried out using a nominal mixture of 80% nitrogen and 20% oxygen. In each test, the heat flux at the point of sample insertion was measured by a copper calorimeter which was transvered across the plasma stream ahead of the sample.

Heat flux data was recorded with a Sanborn strip chart recorder during the arc startup transient and for about 30 seconds thereafter. Total heat flux records run from 50 to 90 seconds. The copper calorimeter plugs were 3/16 inch in diameter and 3/16 or ⅛ long depending on location. Each plug was surrounded by a 0.032 inch thick alumina sleeve and was mounted flush with the outside of the nose surface. An electrical ground wire and a two-wire thermocouple junction were spot welded to the back surface of the plug and were fed out between the model nose and the ablative cover piece. Use of the separate plug ground connected to the ground electrode of the floating two sided input to the recorder was required to reduce noise from plasma potential fluctuations and plasma-surface effects. In reducing calorimeter thermocouple voltage-time histories to obtain heat fluxes the slope of the curve was taken at several points. The maximum and sustained slope occurring after the initial transient were then used to calculate the cold-wall heat flux for that run. This value is recorded as representative heat flux in Table II. This method, while only approximate, is the best available since there was no opportunity to measure a stable ablation-free heat flux. A typical heat flux gage record exhibits a high initial slope at 2-5 seconds as the arc is started at low mass flow and high current, then exhibits a lower, slowly varying slope as the arc jet flow stabilizes at about 10 to 30 seconds followed by a gradual tapering off as ablative shielding decreases the heat transfer rate. The slope in this second sustained region was used to obtain the tabulated heat fluxes. Because some ablation was present at this time, heat fluxes. Because some ablation was present at this time, these values are probably slightly lower than true cold-wall heat fluxes.

TABLE I

| | Composition | Density | Layup Strips | Large Disks | Small Disks | Porosity | Run Duration | Mass Loss | M/Q₁X100 |
|---|---|---|---|---|---|---|---|---|---|
| 1 | 2 carbon-teflon-binder** | — | 10 | 2 | 2 | — | 13'0" | 129 | 1.27 |
| 2 | 3 graphite-phenolic* | 1.32 | 14 | 7 | 7 | 3.6 | 20'35" | 35.2 | .241 |
| 3 | 4 carbon-teflon-binder | 1.96 | 10 | 1 | 1 | 6.9 | 11'6" | 90.9 | 1.05 |
| 4 | 5 graphite-teflon-binder | 1.96 | 9 | 1 | 1 | 6.7 | 14'52" | 32.1 | 1.43 |
| 5 | 6 graphite 19% - teflon 81% | 2.02 | 10 | 2 | 2 | 11 | 7½'"(+) | 88.4 | 1.95 |
| 6 | 7 solid teflon | 2.22 | | | | 0 | 6'42" | 103 | 3.12 |
| 7 | 8 textured teflon | 2.23 | | | | 0 | 3'43" | 62.2 | 3.16 |

TABLE I-continued

| | | Composition | Layup Density | Strips | Large Disks | Small Disks | Porosity | Run Duration | Mass Loss | M/Q$_t$X100 |
|---|---|---|---|---|---|---|---|---|---|---|
| 8 | 9 | graphite-phenolic | 1.32 | 14 | 7 | 7 | 4.5 | 30'39" | 43.2 | .258 |
| 9 | 11 | graphite-phenolic | 1.30 | 14 | 7 | 7 | 4.3 | 8'20" | 32.1 | .514 |
| 10 | 12 | graphite-teflon-binder | 1.98 | 9 | 1 | 1 | 6.7 | 2'38" | 55.1 | 3.98 |
| 11 | 13 | graphite-teflon-binder | 2.0 | 9 | 1 | 1 | 8.7 | 7'15" | 133$^{(+)}$ | 2.94 |
| 12 | 14 | graphite-teflon (81%) | 2.0 | 10 | 2 | 2 | 12.5 | 4'32" | 104 | 2.10 |
| 13 | 15 | graphite-teflon (81%) | 1.95 | 10 | 2 | 2 | 8.7 | 4'27" | 98.6 | 2.82 |
| 14 | 16 | solid teflon | 2.19 | | | | 0 | d"$^{(+)}$ | 102 | 2.35 |

*BLSD 3135
**15.6% carbon 3.4% phenolic, 81% teflon
$^{(+)}$Estimated

Initial weighing of the ablative noses was made before installation of the heat flux gages but after machining of the gage holes. Final weighings were made after the run and after removing all heat flux gage residues. Ablation rates were then determined from the running time measured on a stop watch from the time of arc jet stabilization to arc shutdown. Shutdown time was determined by visual inspection of the remaining ablative nose material. This procedure provided accurate weighings except for Run 13 where the graphite cloth remaining on the nose blew away during the shutdown transient. A residual weight of 20 gm was estimated for this run based on the observed values of 32 gm and 29.5 gm for runs 14 and 15.

An additional ablation time error occurred in Run 6 where the elapsed time was measured by wrist watch, since the stop watch was not started at the proper time. The estimated error for this run duration is 1 minute or about 13 percent. For other runs the error in weight measurement and run duration measurement should not exceed 2 percent to 5 percent depending on run length.

The arc jet and ablation data are summarized in Table II running times, ablated weights, and ablated weights per unit heat flux are given with the nose construction details in Table 1. Because the aerodynamic flow field differs significantly from that about a reentry vehicle, the ablation rates measured cannot be related to any particular flight condition; however, the relative ablation rates between materials can be compared.

The measured effects of a specific ablation mass flux of each ablative on the electrical characteristics of the plasma layer should be similar to flight at similar static pressures and total enthalpies.

Measured static pressures on the conical section near the antenna station are given in Table II. For wind tunnell stagnation pressure of 1.2 psia (runs 1–9) the measured pressures of 0.011 to 0.0145 psia calculated theoretically for a sharp 10° semi-vertex angle cone at M = 4. At 3.0 psia stagnation pressure, however, the measured values remain near 0.010 which is significantly below the theoretical value of 0.037 for a sharp cone. During the wind tunnel purge at psi without the arc jet operating. This indicates that the pressure transducer was operating correctly. Considering the bluntness of the model and the ⅛ inch step at the end of the ablative nose, this compares favorably with the theoretical value for a sharp cone of 0.037 psia. The large decrease to 0.01 psia is believed to be a result of the high concentration of condensable Teflon in the boundary layer. The partial pressure of air would be considerably below the combined pressure of air and Teflon under these conditions.

In all composites tested, the percentage Teflon was held at 81%. This is a very high level and lowering Teflon content would certainly lower the ablation rate, however, it would also lower the degree of plasma alleviation.

TABLE II

| Run | Nose Type | Arc Power kw | Nitrogen Flow qm/min | Plasma Enthalpy h Btu°1lb | Tunnell Stagnation Press. psia | Representative Heat Flux Btu/sec ft$^2$ | | Injectant |
|---|---|---|---|---|---|---|---|---|
| | | | | | | Q$_1$Sta.1 | Q$_2$Sta.2 | |
| 1 | | 0 | | Cold | 1.2 | — | — | 0 |
| 2 | Carbon Teflon Binder | 21.5 | 38.6 | 10,000 | 1.2 | 13 | 5.7 | 0 |
| 3 | Graphite Phenolic | 22.0 | 40.0 | 9,700 | 1.2 | 11.9 | 5.2 | 0 |
| 4 | Carbon Teflon Binder | 21.1 | 39.8 | 9,500 | 1.2 | 13 | 8 | 0 |
| 5 | Graphite Teflon Binder | 21.5 | 39.8 | 9,000 | 1.2 | 9.3 | 6.1 | 0 |
| 6 | Graphite Teflon | 22.5 | 39.8 | 10,200 | 1.2 | 10.1 | 6.4 | 0 |
| 7 | Solid Teflon | 23.4 | 40.0 | 10,200 | 1.2 | 8.3 | 6.2 | 0 |
| 8 | Textured Teflon | 22.5 | 37.3 | 10,400 | 1.2 | 8.8 | 6.2 | 0 |
| 9 | Graphite Phenolic | 23.0 | 38.6 | 10,000 | 1.2 | 9.1 | 6.1 | 0 |
| 9A | Graphite Phenolic | 21.5 | 39.0 | 10,300 | 1.2 | — | — | 11482 |
| 9B | Graphite Phenolic | 23.5 | 39.2 | 10,000 | 1.2 | — | — | 11482 |
| 9C | Graphite Phenolic | 23.5 | 39.0 | 10,000 | 1.2 | — | — | 0 |
| 11 | Graphite Phenolic | 26.4 | 82.0 | 6,400 | 3.0 | 12.5 | 8 | 0 |
| 12 | Graphite Teflon Binder | 26.4 | 82.0 | 6,400 | 3.0 | 8.8 | 6.2 | 0 |

TABLE II-continued

| Run | Nose Type | | | | | | | |
|-----|-----------|------|------|-------|-----|------|-----|---|
| 13  | Graphite Teflon Binder | 24.6 | 76.0 | 5,200 | 3.0 | 10.4 | 6.0 | 0 |
| 14  | Graphite Teflon | 26.1 | 59.0 | 7,100 | 3.0 | 18.2 | 9.0 | 0 |
| 15  | Graphite Teflon | 24.8 | 57.5 | 7,500 | 3.0 | 13.0 | 9.0 | 0 |
| 16  | Solid Teflon | 27.5 | 58.5 | 9,200 | 3.0 | 14.0 | 9.7 | 0 |

| Run | Nose Type | Flow rate gm/min | Avge Ablation rate gm/min | Cone Pressure* (psia) | Peak Rec Power mw | Saturated Rec. Power mw |
|-----|-----------|------|-------|----------|------|------|
| 1   |           | 0    | 0     | —        | .7   | .2   |
| 2   | Carbon Teflon Binder | 0 | 9.9 | .019 | .35 | .1 |
| 3   | Graphite Phenolic | 0 | 1.72 | 10.6–.019 | .04 | .02 |
| 4   | Carbon Teflon Binder | 0 | 8.18 | .015 | .25 | .14 |
| 5   | Graphite Teflon Binder | 0 | 8.0 | .016 | .4 | .17 |
| 6   | Graphite Teflon | 0 | 11.8 | .011 | .7 | .4 |
| 7   | Solid Teflon | 0 | 15.5 | .011 | .6 | .18 |
| 8   | Textured Teflon | 0 | 16.7 | .012 | .4 | .11 |
| 9   | Graphite Phenolic | 0 | 1.41 | — | .1 | .04 |
| 9A  | Graphite Phenolic | 5.7 | 1.41 | — | .01 | .07 |
| 9B  | Graphite Phenolic | 8.8 | 1.41 | .013 | .09 | .09 |
| 9C  | Graphite phenolic | 0 | 1.41 | .015 | .002 | .002 |
| 11  | Graphite Phenolic | 0 | 3.86 | .011 | .06 | .06 |
| 12  | Graphite Teflon Binder | 0 | 21.0 | — | .18 | .08 |
| 13  | Graphite Teflon Binder | 0 | 18.5 | .010 | .21 | .16 |
| 15  | Graphite Teflon | 0 | 22.0 | .012 | .15 | .14 |
| 16  | Solid Teflon | 0 | 19.8 | .010 | .32 | .16 |

*Does not include partial pressure of condensables at 60° F.

Although the invention has been described with reference to a particular embodiment, it is to be understood by those skilled in the art that all the modifications and alternative embodiments encompassed within the appended claims are intended to be included herein.

What is claimed is:

1. An ablative material for use with reentry vehicles and characterized by having a low plasma electron density which comprises a pressed, laminated composite of a multiplicity of alternating layers of a polytetrafluoroethylene resin and a phenolic resin impregnated cloth fabric selected from the group consisting of carbon and graphite cloth in which the total compositional content of said composite is composed of about 15.6 percent by weight carbon, about 3.4 percent by weight phenolic resin, and about 81 percent by weight polytetrafluoroethylene resin.

2. An ablative material in accordance with claim 1 wherein said cloth fabric is carbon cloth.

3. An ablative material in accordance with claim 1 wherein said cloth fabric is graphite cloth.

* * * * *